Jan. 16, 1934.                H. E. TRENT                1,943,749
                              WAX HOLDER
                           Filed Jan. 22, 1929
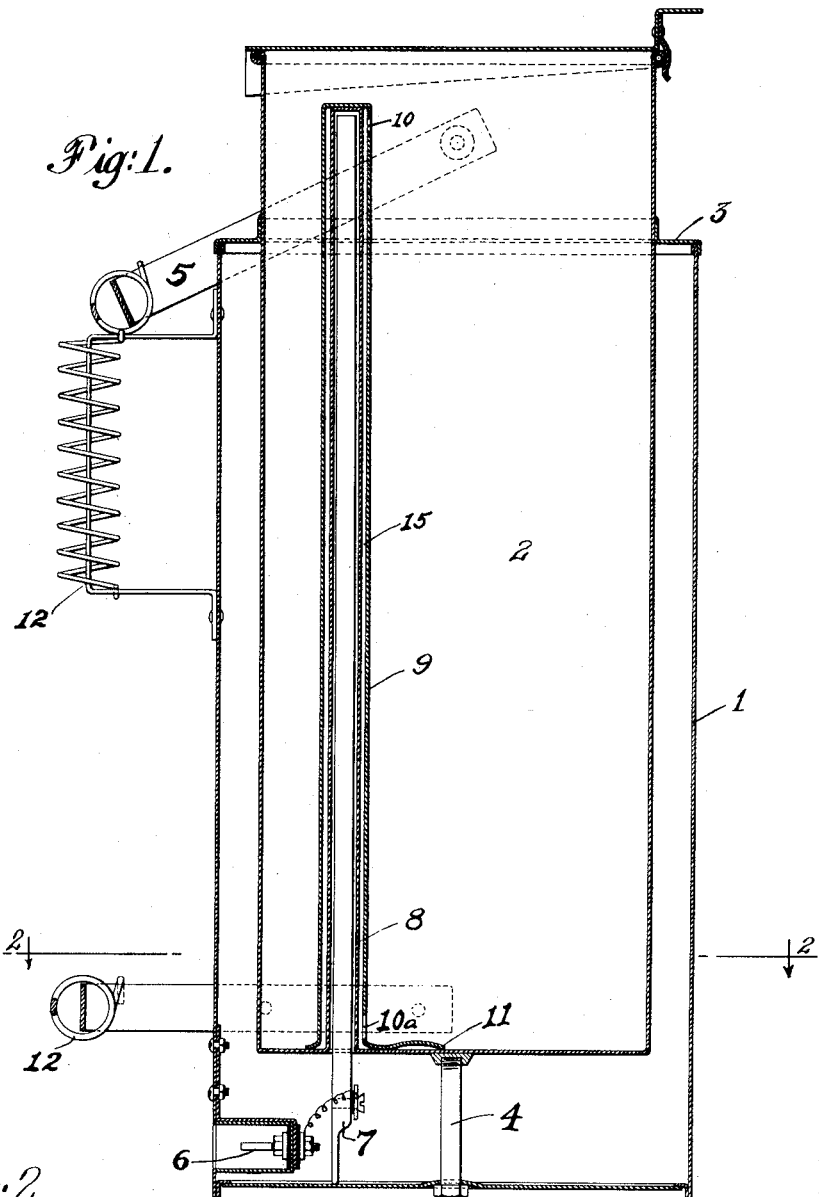
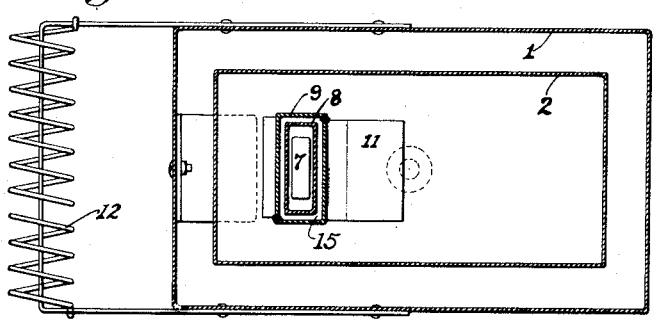
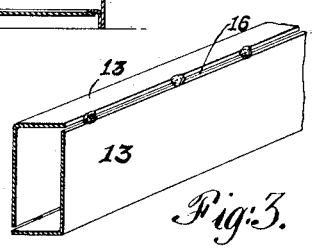
INVENTOR
Harold E. Trent
BY
ATTORNEYS Patented Jan. 16, 1934

1,943,749

UNITED STATES PATENT OFFICE 1,943,749

WAX HOLDER

Harold E. Trent, Lansdowne, Pa.

Application January 22, 1929. Serial No. 334,341

6 Claims. (Cl. 219—44)

This invention relates to an improved device for the melting and handling of wax and the like. The problems of melting wax, of keeping its temperature and consistency uniform, of preventing local overheating and of handling the wax after melting are the particular concern of this invention.

To this end I provide a holder which is cheaply and easily constructed and assembled, light in weight, readily moved from place to place and so designed as to secure rapid melting of the wax and to overcome the various difficulties mentioned herein. Other advantages will become apparent to those skilled in the art upon inspection of the drawing and description which cover a preferred embodiment of my invention.

In the drawing:—

Fig. 1 is a vertical section through the device;

Fig. 2 is a horizontal section on the line 2—2 of Figure 1; and

Fig. 3 is a detail view of a portion of the casing 9, shown in Figures 1 and 2.

The device comprises, essentially, a jacket or housing 1, containing a heating element 7 and in which is mounted a pot 2 containing the wax to be melted. A rim 3 on the pot 2 and a bolt 4 through the base of the jacket, serve to support the pot and to maintain it in spaced relation to the jacket to provide an insulating space around the pot. It will be seen that the pot is readily insertable and removable, as a unit, from the jacket and is provided with a handle 5.

The housing or jacket 1 is provided near the bottom with an electrical contact member or plug 6, of any desired construction, which is set into a recess in the body of the jacket to protect it. This plug is connected, in turn, to the heating or resistance element 7 which extends from the base of the jacket 1 up through an aperture in the bottom of the pot 2. I prefer to employ a heating element in which the resistance is so graduated as to give greater heat at the bottom than at the top, for the reason that if the heat is as great at the top as at the botom local overheating of the molten wax is likely to result. To protect the element 7 from direct contact with the charge in the pot 2, a tube or shell 8 is provided which is welded or otherwise secured to the bottom of the container 2 and which surrounds the element 7.

This shell 8 is, in turn, encased by a sleeve 9 which, however, is not sealed but has apertures 10, 10a at top and bottom. The sleeve 9 is composed of two like angle pieces 13, 13 which are not joined in continuous seams throughout their length, but are spot-welded in spaced relation, as will clearly appear on inspection of Figure 3.

The sleeve or sheath 9 is not fastened to the bottom of the pot 2, but is supported at the top by the shell 8 and at the bottom by a toe 11, which extends at right angles and serves to steady it.

Handles, such as shown at 12, 12, may be attached at suitable points to the jacket.

When charging the pot and melting the wax, no difficulty is to be expected. The operation of the device on subsequent heatings is as follows, assuming that the current has been turned on:

The film of wax around the heating element filling the annular space 15 between the heating element and the sheath 9, is rapidly melted because in the first place it consists of a relatively small amount of wax and in the next place because, temporarily at least, the sheath acts to confine the heat. The melted wax is free to discharge through the aperture 10, above the level of the wax in the pot.

Due to the rapid melting of the film, the sheath 9 acts as a relief passage or circulating channel, relieving the pressure generated in the lower part of the pot. As the wax adjacent the sheath becomes heated and melts it is free to enter into the space 15 and rise through the sheath to discharge through the aperture 10. Thus circulation of melted wax is promoted and in course of time when the entire body of wax is melted the sheath 9 serves to maintain the temperature of the entire mass of melted wax more uniform. The circulation prevents local overheating. The provision of the circulating channel also prevents the carbonization which in the absence of the sheath would take place on the heating element.

The space between the pot and the jacket serves to reduce radiation losses and to protect workmen from the danger of burns.

By the arrangement described, I avoid any difficulties such as would be encountered, for example, if the pot were heated at the bottom, in which case the wax at the bottom would melt first and pressure would build up tending to bulge the pot and, in some cases, bring about something in the nature of an explosion, besides resulting in local overheating.

It will be seen that I have provided an arrangement that can be readily assembled and which provides an insulating space about the pot in a very simple and economical manner. It will also be observed that if it is desired successively to heat a number of pots in the same jacket, this can be done by merely loosening the bolt, removing the heated pot and substituting a cold one.

I claim:—

1. Apparatus for melting wax comprising a jacket containing a heating element rigidly mounted therein and a melting pot apertured to receive the said element, adapted for ready insertion into and removal from the jacket, said jacket and said pot being of such dimensions as to provide a heat insulating space between their respective walls when assembled.

2. Apparatus for melting wax comprising a jacket containing a heating element and a melting pot apertured to receive the said element, adapted for insertion into and removal from the jacket and containing a sleeve surrounding said element and a second sleeve surrounding the first sleeve.

3. Apparatus for melting wax comprising a jacket containing a heating element, and a melting pot apertured to receive the said element, adapted for insertion into and removal from the jacket and containing a sleeve surrounding said element and a second sleeve surrounding the first sleeve, the second being apertured at top and bottom and having slots throughout its length, the first having a continuous, impervious surface.

4. A portable device for melting wax including a pair of vessels telescopically and separately associated with each other the inner one of which is adapted to receive the wax to be melted, the outer vessel being open at the top and having an elongated generally vertically extending heating element permanently mounted therein in spaced relation to its side walls and said inner vessel being provided with an elongated casing therein open at the bottom and adapted to receive said heating element, and means for securing the vessels to each other in telescopic relation including guide means disposed toward the upper ends of the vessels and positioning the vessels laterally and a readily removable and replaceable stud for preventing telescopic separation of the vessels.

5. A portable device for melting wax including a pair of vessels telescopically and separably associated with each other the inner one of which is adapted to receive the wax to be melted, the outer vessel being open at the top and having an elongated generally vertically extending heating element permanently mounted therein in spaced relation to its side walls and said inner vessel being provided with an elongated casing therein open at the bottom and adapted to receive said heating element, and means for securing the vessels to each other in telescopic relation including guide means disposed toward the upper ends of the vessels for positioning the vessels laterally and a readily removable and replaceable member for securing the vessels together as against telescopic separation, said member projecting through the bottom wall of the outer vessel for access at such point.

6. A device for melting wax, including an outer vessel having an elongated heating element extended generally vertically therein, an inner vessel adapted to receive the wax to be melted, said inner vessel being removable and insertible in the outer vessel and having an elongated casing therein open at the bottom to receive said heating element, an additional casing surrounding the first in spaced relation with respect thereto and having vertically spaced apertures therein providing for circulation of the wax in the inner vessel.

HAROLD E. TRENT.